3,023,145
PROTOMYCIN AND ITS PRODUCTION
Toju Hata, 745 Nakameguro-1-chome, Meguro-ku, Ryozo Sugawara, 9 Konnocho, Shibuya-ku, and Akihiro Matsumae, 278 Shimofudacho, Chofu-shi, all of Tokyo, Japan
Filed July 6, 1960, Ser. No. 41,109
8 Claims. (Cl. 167—65)

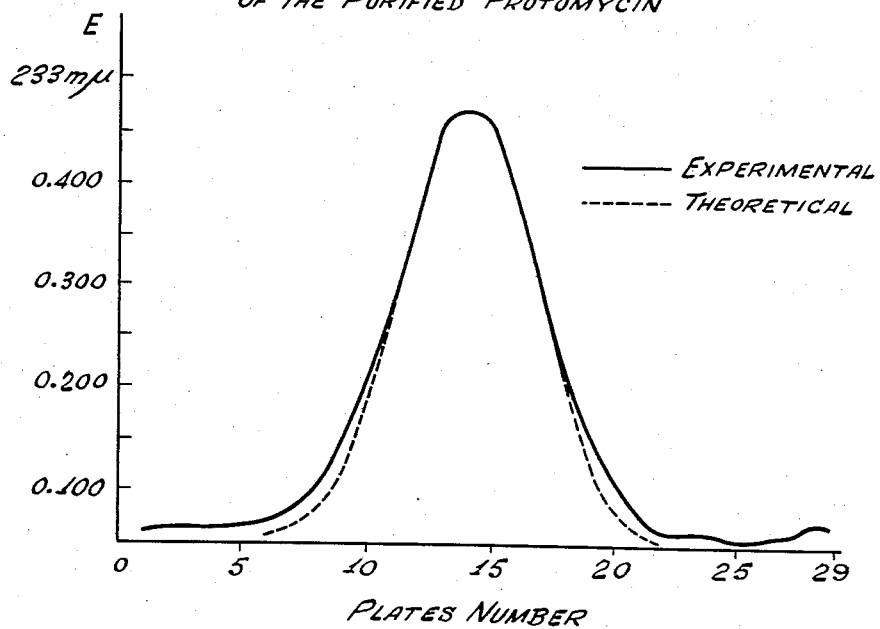

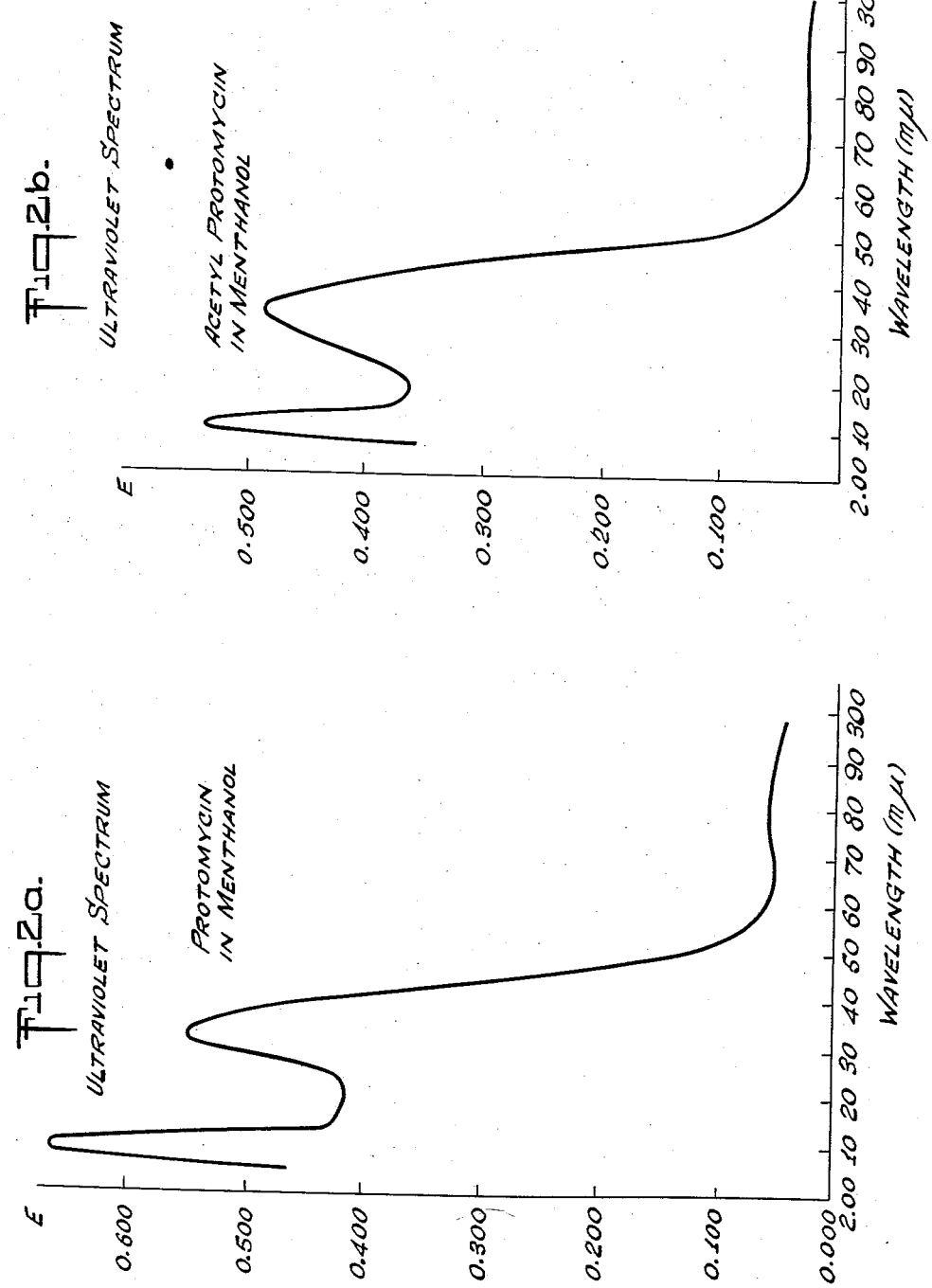

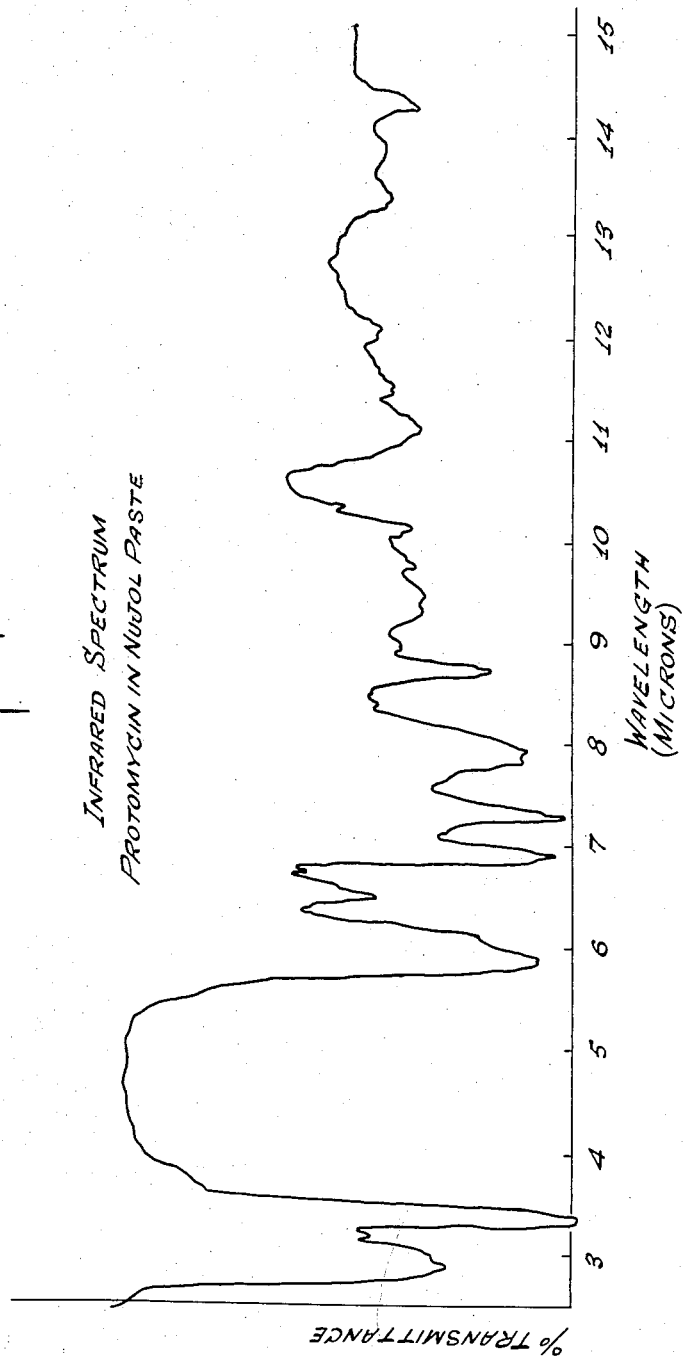

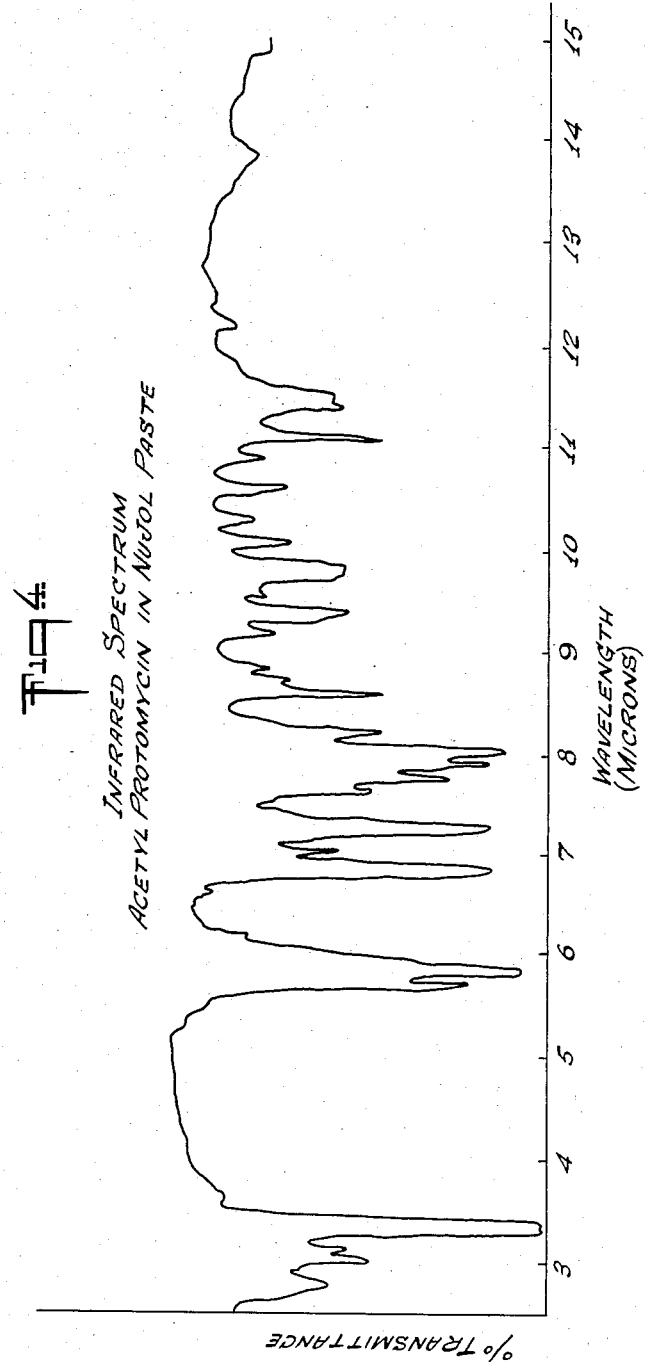

This invention relaes to the production of a new antibiotic and methods of preparing the same. More particularly, it is concerned with an antibiotic substance, herein called protomycin, processes for its production by fermentation, and processes for its recovery from fermentation broths.

Many antibiotics and chemical agents have been studied for the therapeutic treatment of amoebic dysentery. Some of these materials were apparently effective because they were active against the accompanying bacteria of the amoeba, others were not as effective in vivo as in vitro, and others could not be applied clinically because of their toxicity. However, the protomycin of the present invention is an active amoebicide in vitro as well as in vivo in animals without effect on the accompanying bacteria. Protomycin is therefore a valuable germicide useful in sterilizing equipment and areas infected with amoeba such as those causing amoebic dysentery, thereby preventing further contamination and infection. Accordingly, protomycin is an effective decontaminating agent for materials infected with amoeba.

In accordance with one embodiment of our invention, it is now found that protomycin can be produced by growing, under controlled conditions, a previously unknown strain of Streptomyces called by us Strain S-300 and its variants which we have isolated from soil. These strains are related morphologically to *Streptomyces reticuli* (Bergey's Manual of Determinative Bacteriology, 1957), but showed different cultural and physiological characteristics. So, these protomycin-producing strains are herein referred to as *Streptomyces reticuli* var. *protomycicus*.

These strains produced brown pigment in the protein-nitrogen containing media at the time of isolation, but lost this ability after repeated monospore isolation. The variants were classified into two groups according to their colonial findings. One group grew into thick colonies with deep folds and the other grew only to 2 to 3 mm. in diameter. Thus, in this specification, the protomycin-producing strains are classified into three types:

Type I: Original strain producing pigment in the media containing organic nitrogen sources.

Type II: Variants which have lost their pigment production ability.

Type III: Other variants which have lost pigment production ability.

Their taxonomic characters are as follows:

(1) MORPHOLOGICAL CHARACTERISTICS

Type I: An aerial mycelium is produced well on many kinds of media. Secondary whorls are observed after one month of Krainsky's agar. The number of branches in the primary whorls is 2 to 4, meausring 10 to 20$\mu$ in length and that in the secondary whorls is 10 to 20, measuring 5 to 20$\mu$. The secondary whorls change into spores centrifugally. Spores are cylindrical, 0.3 to 0.5 x 1.3 to 2$\mu$. The trunk mycelium consists of deep stained sections of 1.7$\mu$ width and faint stained sections of 2$\mu$ width. The whorls are relatively narrow, their width being approximately 0.3$\mu$. The aerial mycelium on starch agar is approximately the same as described above.

Types II and III: An aerial mycelium is produced, but showned no sporulation. So, the morphological characteristics are not definite. The width of the trunk mycelium is 1.7 to 2.0$\mu$, with monopodial branches. Even on Krainsky's agar and asparagine dextrose agar, the mycelial forms are not so definite as in the original strains. Many primary whorls of 5$\mu$ in length and a few secondary whorls are found in cultures on carrot plug, but without sporulation.

The conventional media for taxonomic studies of Streptomyces were employed. The temperature was 27° C., except otherwise mentioned. The seed cultures were those on Krainsky's agar.

The cultural characteristics are described according to the findings after one to two weeks. The aerial mycelium was observed during one month. The results are as follows:

*Czapek's agar.*—Growth: Thin and spreading, reverse light orange (Type I), reverse dark yellow orange (II), pale olive (III). Aerial mycelium: Powdery, pale orange to light brown (I), white obtaining a shade of pale olive or pale yellow (II), white (III). Soluble pigment: brown (I), none (II and III).

*Krainsky's agar.*—Growth: Pale olive to yellowish brown (I), reddish yellow (II), pale olive or yellowish brown (III). Aerial mycelium: Powdery, white with a shade of olive (I), pale yellowish white (II), white (III). Soluble pigment: Pale brown (I), none (II and III).

*Calcium-malate agar.*—Growth: Light brown (I), reddish yellow (II), dark yellowish orange (III). Aerial mycelium: Thin, white with a pale brownish shade (I), white and margin with yellowish shade (II), none (III). Soluble pigment: Pale yellowish brown (III).

*Starch agar.*—Growth: Reverse dark brown (I, II and III). Aerial mycelium: Pale orange center, pale brown margin (I), yellowish white (II and III). Soluble pigment: None (I, II and III).

*Tyrosine agar.*—Growth: Dull yellow (I), pale yellowish brown (II and III). Aerial mycelium: None. Soluble pigment: Pale yellowish brown, disappeared later (I), pale brown (II and III).

*Asparagine-dextrose agar* (pH 6.0).—Growth: Pale yellow brown (I), dull yellow to reddish yellow (II), yellowish grey (III). Aerial mycelium: Cottony, white with a pink shade (I), none (II and III). Soluble pigment: Pale yellow brown (I), none (II and III).

*Asparagine-dextrose agar* (pH 8.0).—Growth: Reverse reddish brown (I), olive with a yellowish shade (II), yellowish brown (III). Aerial mycelium: White to olive with a yellow or brown shade (I), white, partly (II), none (III). Soluble pigment: Reddish brown (I), yellowish brown (II and III).

*Synthetic solution.*—Growth: Pale yellow to dull yellow surface growth (I), colorless, flocculus (II and III). Aerial mycelium: Pale yellow orange to brown grey (I), white (II and III). Soluble pigment: None.

*Nutrient agar.*—Growth: Grey with a brown shade (I), dark olive (II), olive grey (III). Aerial mycelium:

White obtaining yellowish brown to dull orange (I), white obtaining olive color (II), none (III). Soluble pigment: Dark yellowish brown (I), none (II and III).

*Glucose bouillion agar.*—Growth: Yellowish brown (I), pale olive (II), dull orange (III). Aerial mycelium: White with brown center (I), white (II and III). Soluble pigment: Reddish brown (I), none (II and III).

*Blood agar* (37° C.).—Growth: Grey (I, II and III). Aerial mycelium: None. Soluble pigment: Dark (I), none (II and III).

*Loeffler's serum* (37° C.).—Growth: Pale brown. Aerial mycelium: None. Soluble pigment: Yellowish brown.

*Potato plug.*—Growth: Yellowish brown. Aerial mycelium: White with a brown shade (I), white, partly reddish yellow (II), white with a yellow shade (III). Soluble pigment: Dark yellowish brown (I), yellowish brown (II), none (III).

*Carrot plug.*—Growth: Grey with a brown shade (I), pale yellowish brown (II and III). Aerial mycelium: White with a brown shade (I), white, partly reddish yellow (II), white with a yellow shade (III). Soluble pigment: Dark brown (I), none (II and III).

(3) PHYSIOLOGICAL CHARACTERISTICS

Main physiological characteristics are as follows.
(a) Starch hydrolysis:

|  | Type I | Type II | Type III |
|---|---|---|---|
| 1 week | 26/9 | 38/9 | 30/10 |
| 2 weeks | 44/22 | 37/10 | 54/15 |

(b) Coagulation and peptonization of milk (37° C.): Milk was coagulated within a week followed by slow peptonization, which was complete within four weeks. The pH did not change.

(c) Liquefaction of gelatin:

|  | Type I | Type II | Type III, mm. |
|---|---|---|---|
| 1 week | 25 mm | 10 mm | 0 |
| 3 weeks | Complete | Complete | 5 |

(d) Production of nitrite: Marked in Czapek's solution, slight or none in peptone solution.

(e) Haemolysis: Positive.

(4) UTILIZATION OF CARBON SOURCES

Glucose was replaced with 1% of the respective carbohydrates listed below in Czapek's solution. The aerial mycelium on Krainsky's agar was inoculated into the media and observed for two weeks. The growth was expressed as follows: (*) growth all over the surface, (+) a few colonies on the surface, (±) trace of growth, and (−) no growth.

| | | | |
|---|---|---|---|
| Xylose | −. | Rhamnose | −. |
| Raffinose | −. | Arabinose | −. |
| Lactose | +. | Trehalose | *. |
| Mannitol | *(Type I). (−(Type II, III). | Sucrose | +. |
| | | Inositol | *. |
| Salicin | −. | Maltose | *. |
| Glucose | *. | Dextrin | *. |
| Glycerine | *. | Starch | *. |
| Fructose | *. | Sorbitol | {± (Type I). − (Type II). + Type III). |
| Galactose | {± (Type I). + (Type II). * (Type III). | Inulin | {− (Type I, II). + (Type III). |
| Dulcitol | ±. | Na-acetate | {± (Type I, III). − (Type II). |
| Na-citrate | −. | | |
| Na-succinate | −. | | |

A culture of Strain S–300, *Streptomyces reticuli var. protomycicus* a Type II strain, referred to above which is suitable for the production of protomycin by fermentation has been deposited with the Fermentation Section of the Northern Utilization Research Branch, United States Department of Agriculture at Peoria, Illinois, and added to its permanent culture collection where it is assigned the numerical designation NRRL 2875.

From the above description, *Streptomyces reticuli var. protomycicus* which produces protomycin may be characterized by whorl formation, instability in soluble pigment production non-specific growth color, such as brown, orange and olive, an aerial mycelium of white color with a shade of brown or orange, and by the pattern of carbohydrate utilization common to the reticuli group. This specification describes the characteristics of the original strain and two of its variants, which can be differentiated from each other by the form of the colonies. But, of course, this strain, like other species of streptomyces are likely to have many variant strains, different in their cultural and physiological characteristics.

The above-described strains resemble *Streptomyces reticuli* and belong to the olive-buff series of *Streptomyces biverticillatus*, according to Pridham's classification (A Guide for the Classification of Streptomycetes According to Selected Groups, applied Microbiology 6 (1) 52–79, 1958).

The most important characteristic of these strains is that they produce protomycin.

The descriptions of the microorganisms producing protomycin are given as illustrative of suitable strains of *Streptomyces reticuli var. protomycicus* which can be used in the production of protomycin. The present invention also contemplates the use of other strains of this organism which are mutants of the described organism such as those obtained by natural selection or those produced by mutating agents, for example, X-ray irradiation, ultra-violet irradiation, nitrogen mustards, and the like.

Pursuant to the present invention, it is now found that protomycin can be produced by growing strains of *Streptomyces reticuli var. protomycicus* in aqueous mediums containing assimilable sources of carbon and nitrogen and inorganic salts. In addition, it is found that protomycin can be recovered from the fermentation broths by extraction methods based on its behavior to solvents and adsorbents.

This invention provides protomycin containing fermentation broths which are obtained by the fermentation of spores or mycelium of the above-described protomycin producing strains in an aqueous nutrient medium.

The aqueous nutrient medium may contain nitrogen sources such as soybean meal, soybean oil, peptone, meat extract, corn steep liquor, and yeast extract, carbon sources such as starch, glucose, dextrin, fructose and glycerine, and minerals such as sodium chloride, potassium chloride, calcium carbonate, ammonium sulfate, ammonium nitrate, salts of Zn and Fe and phosphates. These materials may be combined in many ways, although this might result in some variations in the amount of protomycin produced.

The preferred medium for the production of protomycin are those containing about 1.0 to 1.5% of glucose and starch and soybean meal respectively, 0.5% of yeast extract and NaCl respectively, and 0.3 to 0.35% of calcium carbonate and ammonium sulfate respectively.

Spores or mycelia of the protomycin producing strains are inoculated into the sterilized nutrient medium. Surface or submerged fermentation may be employed, though the latter is preferable. The fermentation temperature is 24 to 37° C., preferably 27 to 28° C. The fermentation period is 24 to 72 hours. When the protomycin content in the culture broth attained a maximum as indicated by assay with the cup or dilution methods described below, the mycelium is removed by filtration and activated carbon added to the filtrate. The carbon cake is washed with water and eluted with aqueous organic solvent, such as aqueous methanol or aqueous acetone, preferably with aqueous acetone, particularly with 80% aqueous acetone at about pH 7 or less, preferably at pH 2 to 3. The solvent is evaporated in vacuo keeping the pH slightly acid and protomycin is extracted from the aqueous concentrate with a water-immiscible solvent such as benzene, chloroform, aliphatic esters, lower alkyl alcohols and methyl isobutylketone, preferably with chloroform. Protomycin may also be extracted directly from the culture broth with these organic solvents. The solvent extract is then evaporated to an oily residue. The protomycin containing concentrate so obtained is impure and can be purified further by other procedures.

The crude protomycin concentrate may be further purified with liquid chromatography employing the difference between protomycin and the accompanying impurities in their affinities for adsorbents such as ion exchange resins, alumina, activated carbon, diatomaceous earth and silica or counter-current distribution methods utilizing partition coefficients in an appropriate solvent system, or by molecular distillation under a high vacuum. Any of these methods may be employed singly, but preferably they should be combined or repeated in convenient ways. The purified substance finally obtained is in the form of a viscous liquid at room temperature, in spite of repeated or combined purifications or usual recrystallization techniques. This oily protomycin may be converted into crystalline acetyl protomycin. This acetyl protomycin may be employed for the identification of protomycin of this invention. Alternately, other acyl derivatives can be similarly prepared in accordance with methods known in the art and used to identify the protomycin.

The physical and chemical properties of the purified protomycin obtained in accordance with the above-described procedures are as follows:

(1) The purified protomycin was analyzed for purity with a 30 plate Craig counter-current distribution apparatus in a solvent system which consisted of methanol:0.001 N HCl:benzene (2:8:10 by volume). The amount of solute in each plate was determined by the extinction at 233 m$\mu$ to give the counter-current distribution curve in FIG. 1. (Partition coefficient 0.900.)

(2) The protomycin is obtained as a viscous pale yellow liquid.

(3) The aqueous solution of the purified protomycin was heated for an hour at 100° C. without loss in activity under acid condition (pH 2–5). When a neutral solution was heated under these conditions, only about one third of the original activity remained, and in an alkaline solution, all of the original activity was destroyed.

(4) The substance absorbs bromine, discolors $KMnO_4$ and was positive in Diazo, Nessler's (dull green), Molish (bluish purple) color reactions, but was negative in Millon's, biuret, Sakaguchi, ferri-chloride, Tollen's nitroprussid, silver mirror, Liebermann's, Meyer, Wagner and ninhydrin reactions.

(5) It is soluble in methanol, ethanol, acetone, chloroform, ethyl acetate, butylacetate, dioxane, ether, benzene, hardly soluble in water and insoluble in carbon tetrachloride, carbon disulphide and petroleum ether.

(6) The $R_f$ values in ascending paper chromatography with water saturated solvents were found to be ether 0.85, benzene 0.35, chloroform 0.75, methyl isobutylketone 0.78, petroleum ether 0, cyclohexane 0 and 3% ammonium chloride aqueous solution 0.86.

(7) The molecular weight of the purified protomycin was found to be 274 by the Rast method.

(8) Elemental analysis: C, 64.74%: H, 8.59%: N, 4.27%: S and halogen 0% and oxygen by difference.

(9) Rotation $[\alpha]_D^{27°C.} = 126°$ (c.=1.08 $CHCl_3$).

(10) Ultraviolet absorption spectrum in methanol is represented in FIG. 2a. The absorption maxima and $E_{1\,cm.}^{1\%}$ values in methanol are 209 m$\mu$ (649), 233 m$\mu$ (533), and 280–285 m$\mu$ (27.0).

(11) The infrared absorption spectrum of protomycin in nujol paste is shown in FIG. 3. Characteristic peaks are observed at the following wave lengths in microns: 2.90, 3.05, 3.19, 3.30, 3.40, 5.85, 5.91, 6.20, 6.50, 6.70, 6.90, 7.08, 7.29, 7.82, 7.94, 8.71, 8.95, 9.25, 9.42, 10.10, 10.32, 11.09, 11.45, 11.52, 12.00, 12.12, 13.38, and 14.25.

(12) Microbial activities in the agar dilution method are as follows:

| Organisms | Min. inhibitory concentration (mcg./ml.) | |
|---|---|---|
| Staphylococcus aureus FDA 209p | 100 | Agar streak method with bouillon agar. |
| Staphylococcus citreus | 0.25 | |
| Sarcina lutea | 0.025 | |
| Streptococcus hemolyticus NY5 | 50 | |
| Escherichia coli var. communior | 100 | |
| Candida albicans | 100 | |
| Candida krusei | 10 | With potato glucose agar. |
| Candida tropicalis ATCC | 100 | |
| Saccharomyces cerevisiae | 2.5 | |
| Saccharomyces sake | 1.0 | |
| Aspergillus fumigatus | 2.5 | |
| Piricularia oryzae | 0.05 | |
| Trichomonas vaginalis | 100 | Dilution method with Hamada's media. |
| Endamoeba histolytica | 2.5 | Dilution method with Balamuth's media. |

(13) Toxicity ($LD_{50}$) in mice by intravenous injection is 224 to 273 mg./kg.

(14) Starting 24 hours after the inoculation of 300,000 Endamoeba histolytica into the colon of guinea pigs, a single dose of 50 mg./kg. and 6.25 mg./kg. of protomycin was given orally once a day for five days. Survival ratios of the treated animals 3 weeks after inoculation were 5/5 and 6/7, while those in the control groups were 1/5 and 3/7 respectively.

The purified protomycin remained oil, but was proved to be a single substance. From the above properties, particularly from the ultraviolet absorption spectrum, protomycin of this invention is believed to be a new substance.

Crystalline acetyl protomycin, obtained by the acetylation of the purified protomycin is convenient for the identification of this substance. The properties of acetyl protomycin are as follows:

(1) White fibrous crystals.

(2) M.P.: 110 to 111° C.

(3) Elemental analysis: Found: C, 62.55%; H, 6.62%; N, 4.44%.

(4) Molecular weight: Found: 307.7 (Rast method).

(5) Ultraviolet absorption spectrum of methanol solution is shown in FIG. 2b. Absorption max. are 210 m$\mu$ ($E_{1\,cm.}^{1\%} = 537$), 233 m$\mu$ ($E_{1\,cm.}^{1\%} = 490$)

and 280 − 291 m$\mu$ ($E_{1\,cm.}^{1\%} = 24.3$)

(6) The infrared absorption spectrum of acetylated protomycin in nujol paste is shown in FIG. 3. Characteristic peaks are observed at the following wave lengths in microns: 2.82, 3.02, 3.18, 3.30, 3.40, 5.73, 5.82, 5.89, 6.21, 6.85, 7.05, 7.26, 7.65, 7.79, 7.89, 8.02, 8.20, 8.59, 8.72, 8.82, 9.19, 9.38, 9.56, 9.72, 9.78, 9.82, 10.04, 10.29, 10.59, 10.88, 11.09, 11.39, 11.52, 12.19 and 13.80.

(7) The amoebicidal concentration for Endamoeba histolytica is 5 mcg. per ml.

(8) Analysis by Kuhn-Roth's method showed 0.94 mol of acetic acid.

Protomycin was assayed by a serial dilution method, employing Endamoeba histolytica in Balamuth's media. It was also assayed by the cup method, employing Saccharomyces sake on potato-glucose media. In addition, it was measured by the extinctions at 233 m$\mu$, an absorption maximum specific to protomycin. Thus, in the following examples, the potency of the protomycin samples is expressed by the minimum inhibitory concentrations against Endamoeba histolytica and by $E_{1\,cm.}^{1\%}$ values The examples for the practice of this invention were described as a combination of several processes of extraction and purification. These extraction and purification processes may be used singly, repeatedly or in combinations or after modifications well known to the art. Thus, it should be understood these examples illustrate procedures useful in our invention which is restricted only by the appended claims.

Example 1

The protomycin producing strain No. S-300 was fermented under submerged conditions for two days at 28° C. in the medium, containing 1.5% glucose, 1.5% starch, 1.5% soybean meal, 0.5% NaCl, 0.3% $(NH_4)_2SO_4$, 0.5% yeast and 0.3% $CaCO_3$. The fermented broth was filtered to give 4000 ml. of the filtrate. The filtrate exhibited an activity of 80 dilution units/ml. against *Endamoeba histolytica*.

To this filtrate was added 10 g. (0.25%) of activated carbon, it was stirred for 15 min. and filtered. The activity of the filtrate was less than 10 units showing that the protomycin in the filtrate had been almost all adsorbed on activated carbon. The carbon cake was washed with water and stirred with 100 ml. of 80% aqueous acetone at pH 3 to 5 for 30 minutes to elute protomycin. This procedure was repeated three times and the solvent was evaporated at 50° C. to give 100 ml. of aqueous solution containing 2000 units/ml. of protomycin. This solution was extracted with 1/20 volume of chloroform to yield a solution containing 6400 units/ml. of protomycin. The solvent was evaporated in vacuo to give 1.6 g. of syrup. The activity of this syrup was 80 units/mg.

Example 2

Two and a half grams of the protomycin containing syrup prepared as described in Example 1 was purified by counter-current distribution with 30 plates containing 30 ml. of solvent in each phase. The solvent for the distribution consisted of benzene, methanol and 0.001 N HCl containing 2% sodium sulfate in the ratio of 10:2:8 by volume. After the distribution, fractions with higher concentration of protomycin were collected, evaporated in vacuo and the residual aqueous solution was extracted with chloroform. The solvent was then evaporated in vacuo to give 300 mg. of syrup with an activity of 400 units/mg.

$(E_{1cm.}^{1\%} = 328$ in methanol at $233m\mu$

The crude protomycin was purified again with counter-current distribution with 30 plates containing 30 ml. of solvent in each phase. The solvent system was benzene, methanol and 0.001 N HCl in the ratio of 10:2:8 by volume. The fractions with higher concentrations were collected and the solvent was evaporated. The aqueous residue was extracted with chloroform. The solvent phase was washed with water, dried over $Na_2SO_4$ and evaporated to give 200 mg. of a crude protomycin. The activity was 400 units/mg.

$E_{1cm.}^{1\%} = 401$ (in MeOH) at $233m\mu$

Example 3

Two hundred and fifty milligrams of the protomycin obtained as described in Example 2 was purified further by molecular distillation ($10^{-3}$ mm. Hg and 130 to 150° C.). The distillate was 150 mg. of pale yellow viscous syrup. The activity was 400 units/mg.

$E_{1cm.}^{1\%} = 499$ (in methanol) at $233m\mu$

Example 4

Ten grams of activated carbon and 20 g. of diatomaceous earth were stirred in 50% aqueous acetone and was made into a column for chromatography. 2.6 grams of the syrup obtained from Example 1 was dissolved in a small amount of 50% aqueous acetone and was placed on the column. The column was then developed with 50% aqueous acetone acidified at pH 2.5 with HCl. The colorless to pale yellow active eluate came out following the colored fractions without activity. Three thousand ml. of the eluate was evaporated in vacuo and was extracted with chloroform and chloroform was evaporated to yield 350 mg. of a syrup with an activity of 400 units/mg.

$E_{1cm.}^{1\%} = 368$ at $233m\mu$

Example 5

Three hundred milligrams of the syrup from Example 4 was dissolved in benzene and was placed on the column made from 5 g. of alumina previously washed with HCl. After the colored fractions without activity were eluted with benzene, there were eluted protomycin containing fractions with benzene containing 1% methanol. Two hundred ml. of the fractions were evaporated in vacuo to give 250 mg. of a syrup. The activity was 400 units/mg.

$E_{1cm.}^{1\%} (233m\mu) = 442$

Example 6

Two hundred mg. of the crude protomycin from Example 5 was dissolved in 5 ml. of acetic anhydride and one drop of concentrated sulfuric acid added. After having been allowed to stand two or three hours at room temperature, the reaction mixture was extracted with ether. The ether was washed with water, dried over $Na_2SO_4$ and evaporated to give a viscous residue. The residue was recrystallized twice from aqueous methanol and finally from ether to yield 100 mg. of acetyl protomycin. M.P. was 110 to 111° C. The activity was 200 units/mg.

In similar manner protomycin can be converted to the corresponding acylated derivatives by reaction with other lower alkanoic acid anhydrides. For example, in this way the propionate, butyrate and valerate derivatives of protomycin can be prepared. Esters of other hydrocarbon carboxylic acids having from one to nine carbon atoms can be prepared in accordance with methods known in this art.

As has been shown above, protomycin and its acylated derivatives are active antibiotics which are particularly effective amoebicides. Thus, they are especially active against *Endamoeba histolytica*, a pathogenic amoeba causing human dysentery, and are therefore useful decontaminating agents for sterilizing equipment, other materials and areas contaminated with this amoeba. Since protomycin is extremely active as an amoebicide in low concentrations, suitable liquid or solid preparations, such as dusting powders, containing the antibiotic or concentrates thereof in an amount sufficient to be active decontaminating agents can be prepared in accordance with methods known in this art.

What is claimed is:

1. Protomycin, said antibiotic being characterized as a pale yellow viscous liquid, soluble in methanol, ethanol, acetone, chloroform, ethyl acetate, butylacetate, dioxane, ether, and benzene, insoluble in carbon tetrachloride, carbon disulphide and petroleum ether, having a molecular weight of about 274 by the Rast method, having shown upon analysis 64.71% carbon, 8.59% hydrogen, 4.27% nitrogen, and by difference 22.40% oxygen, having absorption maxima in the ultraviolet region at about 209 $m\mu$ $(E_{1cm.}^{1\%}$ 649) and $233m\mu$ $(E_{1cm.}^{1\%}$ 533)

and $280-285m\mu$ $(E_{1cm.}^{1\%}$ 27)

having a rotation of $[\alpha]_D^{27°C.} = 126°$ (c.=1.08 $CHCl_3$), having characteristic infrared absorption peaks at about 2.90, 3.05, 3.19, 3.30, 3.40, 5.85, 5.91, 6.20, 6.50, 6.70, 6.90, 7.08, 7.29, 7.82, 7.94, 8.71, 8.95, 9.25, 9.42, 10.10, 10.32, 11.09, 11.45, 11.52, 12.00, 12.12, 13.38 and 14.25 microns, absorbing bromine, discoloring potassium permanganate, giving positive Diazo, Nessler's and Molish color reactions, giving negative Millon's, biuret, Sakaguchi, ferri-chloride, Tollen's, nitroprusside, silver mirror, Liebermann's, Meyer, Wagner and ninhydrin reactions, and forming an acetyl derivative melting at about 110–111° C.

2. Acylated derivatives of the product of claim 1.

3. Lower alkanoic acid esters of the product of claim 1.

4. The acetylated derivative of the product of claim 1.

5. The process which comprises growing a protomycin producing strain of *Streptomyces reticuli* var. *protomycicus* in an aqueous nutrient medium containing assimilable sources of carbon and nitrogen until substantial antibiotic activity is imparted to said medium.

6. The process of claim 5 wherein the nutrient medium contains glucose, starch and soybean meal.

7. The process which comprises growing a protomycin producing strain of *Streptomyces reticuli* var. *protomycicus* in an aqueous nutrient medium containing assimilable sources of carbon and nitrogen until antibiotic activity is imparted to said medium and recovering protomycin from the resulting fermentation broth.

8. A process for the recovery of protomycin from filtered fermentation broths produced by growing a protomycin-producing strain of *Streptomyces reticuli* var. *protomycicus* in an aqueous nutrient medium, which comprises adsorbing the protomycin on carbon, and eluting the protomycin from the carbon adsorbate with an aqueous organic solvent.

No references cited.